(12) United States Patent
Alexander et al.

(10) Patent No.: US 11,190,518 B1
(45) Date of Patent: Nov. 30, 2021

(54) MULTI-DOMAIN MANAGEMENT SYSTEM

(71) Applicant: Wells Fargo Bank, N.A., San Francisco, CA (US)

(72) Inventors: Robyn Alexis Alexander, Gainesville, FL (US); Patrick James Bair, Carnegie, PA (US); Zachery Phillip Hostens, Davenport, IA (US); Arian Adolfo Amador, Fort Lauderdale, FL (US); Joseph Gregory Acklin, Mooresville, NC (US); Raymond Lawson Gump, Winston Salem, NC (US); Robert Patrick Smith, Fayetteville, GA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 342 days.

(21) Appl. No.: 16/169,390

(22) Filed: Oct. 24, 2018

(51) Int. Cl.
*H04L 29/06* (2006.01)
(52) U.S. Cl.
CPC ........ *H04L 63/102* (2013.01); *H04L 63/0815* (2013.01); *H04L 63/0892* (2013.01)
(58) Field of Classification Search
CPC .......... G06F 21/30; G06F 21/31; G06F 21/41; G06F 21/45; H04L 63/08; H04L 63/0815;
(Continued)

(56) References Cited

U.S. PATENT DOCUMENTS 7,702,747 B1* 4/2010 Liu ..................... G06F 21/604
                                                        709/217
8,073,719 B2  12/2011 Orttung et al.
(Continued)

FOREIGN PATENT DOCUMENTS

CN      101605031    12/2009
WO      2017124882    7/2017

OTHER PUBLICATIONS

Phil Hodges. "Managing Multiple Domains from a Single Hosting Account," cPanel Blog; published Jan. 31, 2012, download URL: https://blog.cpanel.com/managing-multiple-domains-from-a-single-cpanel-account/.

(Continued)

*Primary Examiner* — Edward Zee
(74) *Attorney, Agent, or Firm* — Kilpatrick Townsend & Stockton LLP

(57) ABSTRACT

The innovation disclosed and claimed herein, in one aspect thereof, comprises systems and methods of an improved multi-domain management system. The innovation provides mitigation of uncontrolled privilege and access, lacking defined roles for at user. The innovation mitigates risk of inadvertent error while not diminishing desired trans-domain user capability. Functions such as creating user and/or service accounts, group creations, group memberships, host memberships, and the like, may thus be undertaken from a single high level location, based on controlled user rules at that level, and may do so without regard or limitation to the specific domains or master server controls at the specific domains. Agnostic aspects are coupled with scalability regardless of number of domains. Such an improved management system provides for mitigating risk of human interactions across multiple domains and multiple domain interactions without diminishing desired user controls at the highest electronic infrastructure interaction level.

18 Claims, 6 Drawing Sheets

(58) Field of Classification Search
CPC . H04L 63/0884; H04L 63/0892; H04L 63/10; H04L 63/102
See application file for complete search history.

(56) References Cited

U.S. PATENT DOCUMENTS

| | | |
|---|---|---|
| 8,312,125 B1 | 11/2012 | Rioux et al. |
| 9,189,753 B2 | 11/2015 | Morley et al. |
| 9,276,929 B2 | 3/2016 | Williams et al. |
| 9,286,446 B2 | 3/2016 | Berger |
| 9,503,501 B2 | 11/2016 | Toussaint et al. |
| 9,740,568 B2 | 8/2017 | Karinta et al. |
| 2003/0037131 A1 | 2/2003 | Verma |
| 2008/0244517 A1 | 10/2008 | Rostoker |
| 2010/0042735 A1 | 2/2010 | Blinn et al. |
| 2011/0055331 A1 | 3/2011 | Adelman et al. |
| 2015/0089597 A1* | 3/2015 | Srinivasan ............ H04W 12/06 726/4 |
| 2015/0242256 A1 | 8/2015 | Morrissey |
| 2017/0140356 A1 | 5/2017 | Desai et al. |

OTHER PUBLICATIONS

"Your Dashboard: All Your Websites in One Place", Jimdo, https://www.jimdo.com/blog/news/, Aug. 17, 2017.

\* cited by examiner

MULTI-DOMAIN MANAGEMENT SYSTEM

BACKGROUND

Due to the nature of large scale interactions of complicated electronic domains that make up an overall electronic infrastructure for entities of appreciable size and disbursed distribution, management for among other things, functionality across multiple domains and scalings of multiples of a same domain type, is lacking. Within domains, conventional tools such as line item controls or rudimentary web-based controls are limited to a domain level.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation in one embodiment may provide an improved multi-domain management system. Creating a master server type of control at a higher than single (or multiple) domain level may create a risk that a user at that level may have uncontrolled privilege and access across domains, as defined roles for that user may only be conventionally controlled within a domain. The innovation applies privilege and role control at a top level. A layer of access control provides for scope-controlled interaction, mitigating risk of inadvertent error while not diminishing desired trans-domain (multi-domain) user capability. Such an improved multi-domain management system may provide for mitigating risk of human interactions across multiple domains and multiple domain interactions without diminishing desired user controls at the highest electronic infrastructure interaction level.

The innovation disclosed and claimed herein, in one aspect thereof, comprises systems and methods of network authentication/authorization for infrastructure setting and control. A system of the innovation can include a user connection component that provides a controlled access to one or more users; a sub-system interface component that provides access to a plurality of domains of an overall electronic infrastructure; and a management component that associates the controlled access of the one or more users to access of the plurality of domains. It is to be appreciated that the association may automate plurality of domain access without user interaction, and that a management component may translate and provision a plurality of tasks agnostically across the access of the plurality of domains, based at least in part on user controlled access.

A method can provide one or more user connections; provide authentication/authorization controls for the one or more user connections; and manage translation and provisioning of services for the authenticated/authorized one or more users that span across a plurality of domains of an overall electronic infrastructure.

A computer readable medium of the innovation has instructions to control one or more processors configured to receive one or more user connections; apply authentication/authorization controls for the one or more received user connections; and manage translation and provisioning of services for the authenticated/authorized one or more users of the received user connections that span across a plurality of domains of an overall electronic infrastructure.

In aspects, the subject innovation provides substantial benefits in terms of domain management system work across multiple domain infrastructures. One advantage resides in mitigating risk of uncontrolled user access at a top or "console" level. Another advantage resides in increased ability in structuring electronic infrastructures including providing Application Program Interface (API) functionality for automation services that may be domain agnostic.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
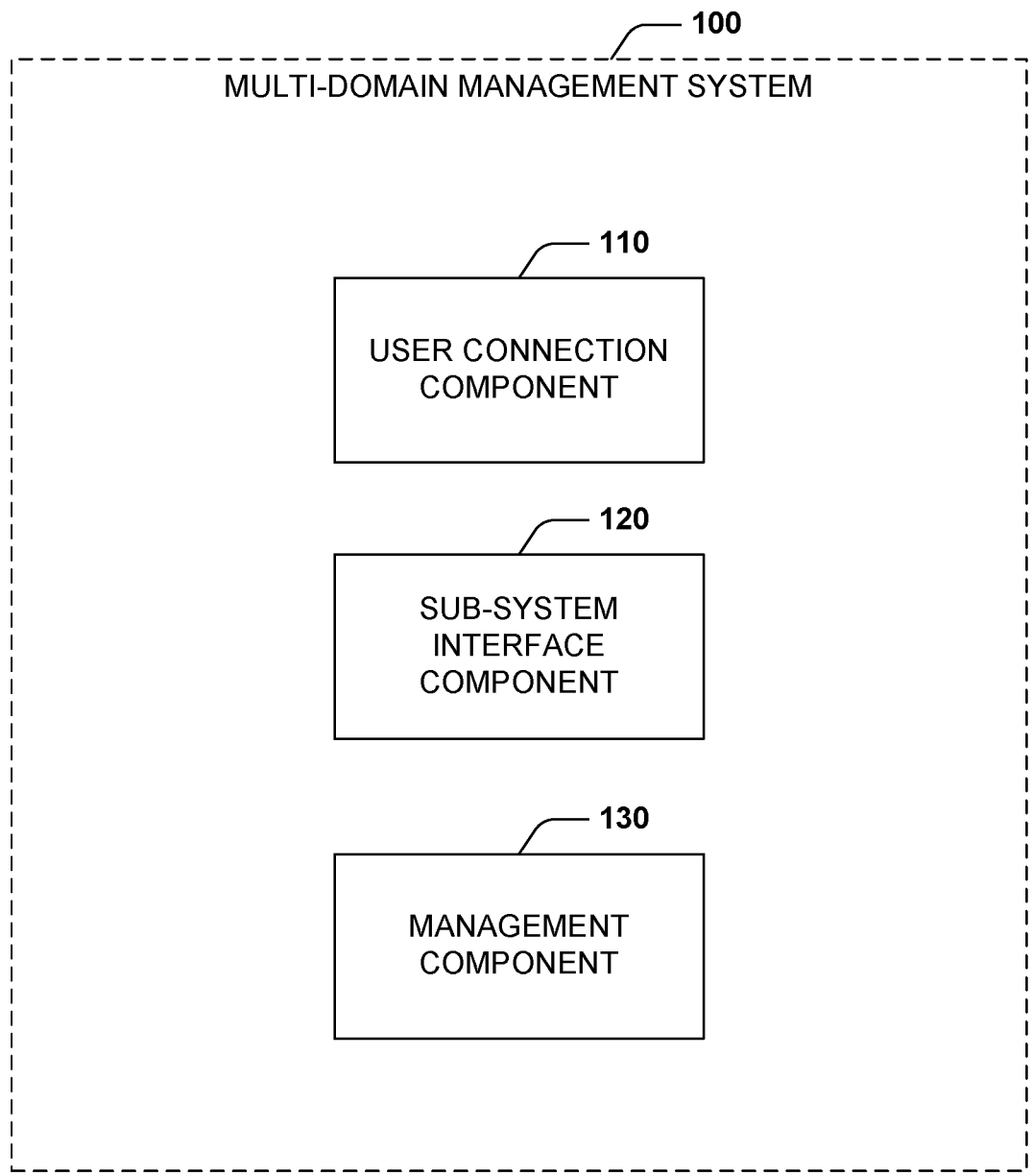
FIG. 1 illustrates an example component diagram of a multi-domain management system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices may be shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a multi-domain management system 100 for managing tasks involved with multiple or multiple-diverse domains in an overall electronic infrastructure. The network system 100 includes a user connection component 110. The user connection component 110 may be a web application through a secure connection that provides access between one or more users and a management component (as will be discussed) of a multi-domain management system, such as multi-domain management system 100. In another embodiment, user connection component 110 may be a dedicated connection. It is to be appreciated that user connection component 110 may be provided with access control at a user end, or may be provided without access control at a user end. The user connection component 110 is logically coupled to a sub-system interface component 120. Sub-system interface component 120 will be discussed in more detail in relation to FIG. 2. As an overview, sub-system interface component 120 may include the provisioning of Application Program Interface (API) functionality to make services that span domains, including for example automation services, agnostic to the domains spanned. Functions such as creating user and/or service accounts, group creations, group memberships, host memberships, and the like, may thus be undertaken from a single high level location, based on controlled user rules at that level, and may do so without regard or limitation to the specific domains or master server controls at the specific domains. Additionally, agnostic aspects are coupled with scalability regardless of number of domains. Elimination of any manual interaction, as may be required if multi-domain processing were to be undertaken otherwise, provides for error reductions within the setup and operations of the resultant infrastructures. A history analysis component (not shown) may also provide for technical improvements in recovery or system error/failure processing and correction. In some embodiments, a management component (as will be discussed) may provide history analysis. It is to be appreciated that managing and tracking history may be associated with one or more data stores as will be discussed in relation to FIG. 2.

The user connection component 110 is logically coupled to a management component 130. Management component 130 will be discussed in more detail in relation to FIG. 3. It is to be appreciated that the management component 130 ties the user connection component 110 to a sub-system interface component, such as for example, sub-system interface component 120, as will be discussed in greater detail in relation to FIG. 2. An example of part of a user connection component 110 may be a Ruby on Rails web interface accessible via a secure web protocol (for example, a secure HTTP (Port 443)).

It is to be further appreciated that controls at such a top level and based at least in part upon users controls may provide technological benefits of custom domain synchronization between production, development and testing of various items within the electronic infrastructure. These various items may be coupled through a sub-system interface component such as sub-system interface component 120, with a management component, such as management component 130 of FIG. 1. In some embodiments, user controls at a top level control system may be pre-set, in other embodiments; these may be set, or modified, on the fly. Management component 130 may also simplify provisioning across multiple domains (true single source provisioning). With such single source provisioning, some embodiments may include standardized input or input definition protocols.

Figure 2:
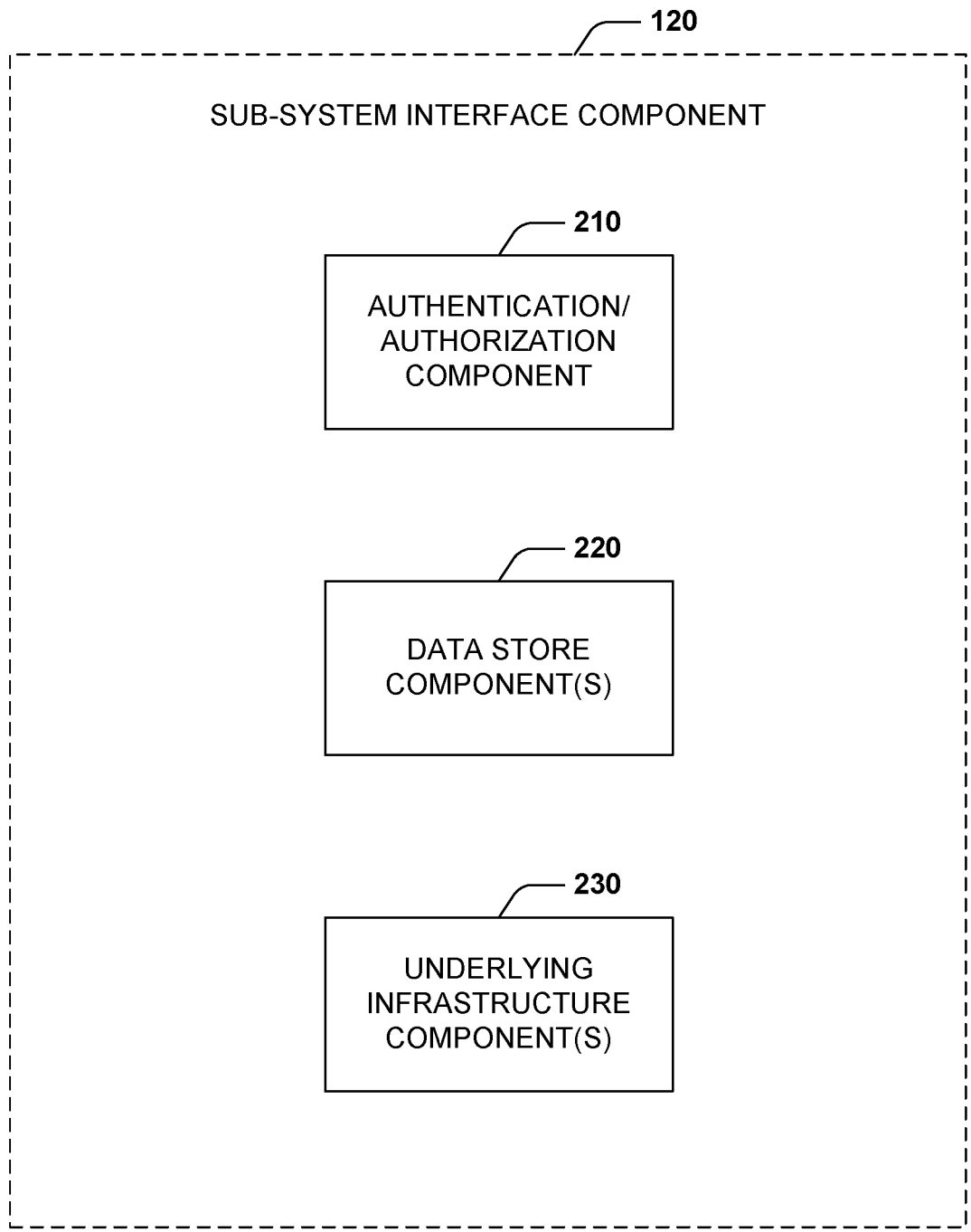
FIG. 2 illustrates an example component diagram of a sub-system interface component in relation to an embodiment of the innovation.

FIG. 2 illustrates a detailed component diagram of a sub-system interface component 120. The sub-system interface component 120 may include an authentication/authorization component 210. Authentication/Authorization component 210 may provide identity and access functionality at a level not typical in console operations, and may provide ability for a multi-domain management system that is agnostic to a specific console. Such may provide for a flexible web application and provide selected capabilities at a global level based on a profile capability of an authentication/authorization component 210. For example, one part of an authentication/authorization component 210 may be an enterprise lightweight directory access protocol (LDAP) authentication via an Active Directory infrastructure. An embodiment may include an internally developed authorization mechanism, such as an Employee Services module. Other embodiments may use externally developed mechanisms. It is to be appreciated that across embodiments, top level user control may be enacted and may be set to be needs-based or other role based control. Control across multi-domains may also be provisioned (as through a provisioning component as will be discussed later in relation to FIG. 3, and may be provisioned or configured across domains or per domain with automatic provisioning outside of user interaction.

Sub-surface interface component 120 may also contain a plurality of data stores or data store components 220. For example in an embodiment, a subset of one or more back end data stores may be used in line with a subset of one or more fault tolerance data stores. A subset of one or more data stores may be internal to the infrastructure being managed for an entity, while another subset of one or more data stores may be used in association with and particular to third party tools. In this manner, domain specific infrastructure (and infrastructure controls that may vary from domain to domain) may be made to be not limiting as at least mapping may be automated.

Sub-surface interface component 120 may also contain a plurality of underlying infrastructure components 230. Plurality of underlying infrastructure components 230 may for example be related to the subset of one or more data stores that are in association with and particular to third party tools. It is to be appreciated that the mapping to sub-systems and domains may be automated by the underlying infrastructure component 230. As a non-limiting example, a REDIS datastore may be associated with SidKiq (an example queue management tool) and through a Simple Object Access Protocol ("SOAP") may be associated with a Web services mission data system that may be tied to a plurality of domain infrastructures, such as, for a non-limiting example, a Behörighets Och Kontroll System (BoKS) infrastructure. It is to be appreciated that infrastructure functionality such as scheduling, throttling, and the like may be executed through and within such domain infrastructures, and that API functionality may be managed at a management component, for example, management component 130 of system 100 through the interaction with subsystem interface component 120.

Figure 3:
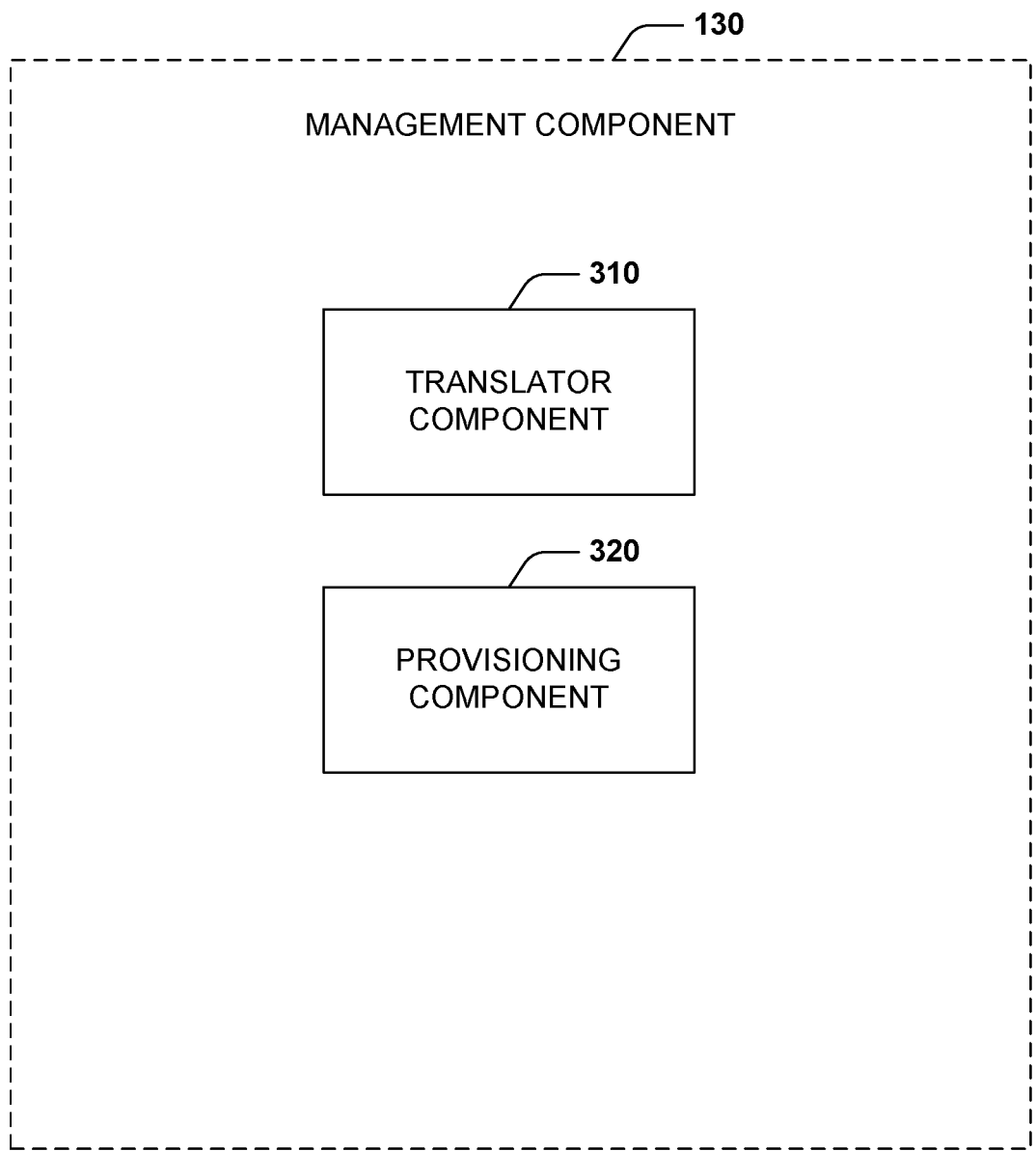
FIG. 3 illustrates an example component diagram of a management component in relation to an embodiment of the innovation.

Turning now to FIG. 3, a management component 130 may contain a translator component 310. Translator component 310 may provide API cross-domain capability. Translator component 310 may interface with authentication/authorization component 210 and/or one or more data store component(s) 220 to provide permissions at the multi-domain management system 100 level. A management component 130 may also contain a provisioning component 320. Provisioning component 320 may simplify provisioning across multiple domains from a single top level multi-domain management system source. Technical improvements from such capability include ability to standardize inputs and input definitions that are agnostic to any domains to which the multi-domain management system controls. Such will reduce technical and other errors, increase consistency and may ensure that necessary information is provided. Further, by applying a consistent and controlled authentication/authorization at the top level, profiles for access and control may be ensured to be needs-based, and may enable users of the multi-domain management system to be freed from remembering a plethora of domain-specific access requirements. Additionally provisioning component 320 may provide for reporting across all domains. It is to be appreciated that as noted earlier, other cross-domain efficiencies may also be obtained, such as provision of custom domain synchronization between production, development and testing of various items within the technical infrastructure.

It is also to be appreciated that the top-down level control may yield technical benefits from a top level down through various domains. For example, creation of new identification credentials may be undertaken from a multi-domain management system 100 that coordinates identification and access parameters consistently and agnostically (regardless of domains that may populate the multi-domain infrastructure). Flow down from such a multi-domain management layer throughout a multi-domain infrastructure may occur to populate the one or more data stores 220 of sub-system interface component 120 automatically for newly created profiles. In some embodiments, sub-system interface component 120 may provide rules that inform options at the time of profile creation. As such, it is to be appreciated that a technical improvement may be realized for installation tasks dealing with multiple domains. Another advantage to be appreciated is that formatting across domains, including domains that are not integrated is facilitated. Through a translator component, such as translator component 310, API calls may be initiated that provide entire infrastructure access and controls in a domain agnostic manner. It is to be appreciated that such access and controls may be pre-determined or controlled at any level and even at the top level of a multi-domain management system based at least in part on settings in authentication/authorization component 210.

Figure 4:
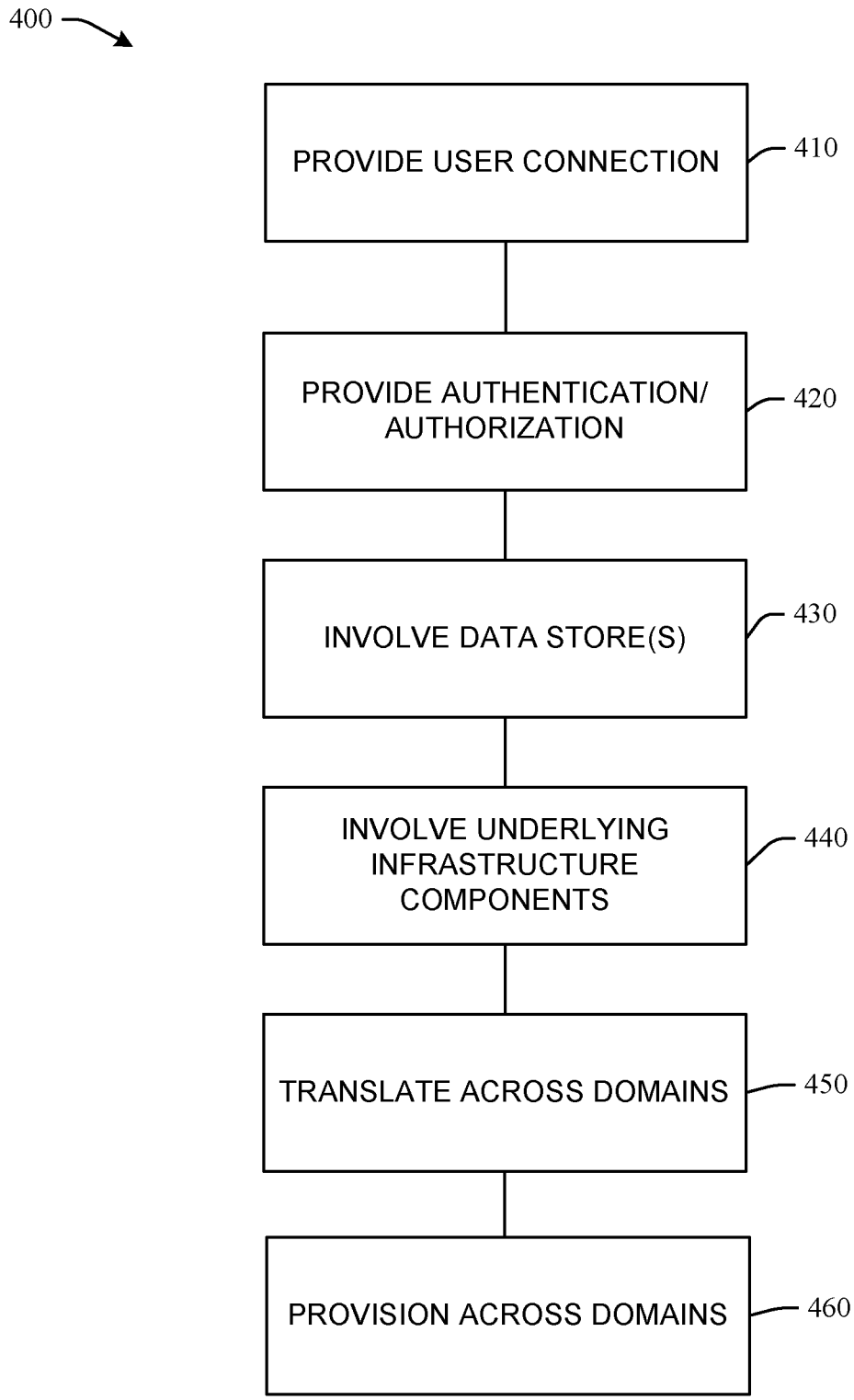
FIG. 4 illustrates a method for multi-domain management.

With reference to FIG. 4, example method 400 is depicted for providing a multi-domain management system. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 can be described in conjunction with a specific example is for explanation purposes.

FIG. 4 illustrates a method 400 for providing a multi-domain management system. At 410, a user connection may be provided. A user connection may be as described in relation to FIG. 1, per user connection component 110 as discussed earlier. At 420, authentication/authorization may be provided. Authentication/authorization may be provided based on conditions as discussed in relation to authentication/authorization component 210 of FIG. 2 as discussed earlier. It is to be appreciated that 420 may be invoked in the order portrayed in FIG. 4, or may be invoked in another order (as described in relation to authentication/authorization component 210 of FIG. 2 as discussed earlier). At 430, the method may involve one or more data stores. The involvement of one or more data stores may be in accordance with the description of data store component(s) 220 of FIG. 2. It is to be appreciated that involvement of the one or more data stores may be as portrayed in FIG. 4 or may be intermittent or looped from other elements as portrayed in FIG. 4, and such involvement is reflected in the prior provided discussion of data stores component 220 of FIG. 2, sub-system interface component of FIGS. 1 and 2, and management component 130 of FIGS. 1 and 3.

At 440, the method involves a plurality of underlying infrastructure components. The plurality of underlying infrastructure components may be as described previously in relation to underlying infrastructure component(s) 230 of FIG. 2. It is to be appreciated that a plurality of underlying infrastructure components provides domain specific functionalities. At 440, the plurality of data store components may associate the domain specific functionalities with infrastructure-wide identity and access controls. In an embodiment, 440 may interact with 420. It is to be further appreciated that a plurality of underlying infrastructure components may be associated with at least one of a subset of domains that are of a different infrastructure from each other, or a subset of a plurality of domains of a same infrastructure, wherein the subset of plurality of domains of a same infrastructure has scale impacts to the overall electronic infrastructure. In embodiments, the plurality of underlying infrastructure components may be associated with at least one of a subset of domains that are of a different infrastructure from each other, and a subset of a plurality of domains of a same infrastructure, wherein the subset of plurality of domains of a same infrastructure has scale impacts to the overall electronic infrastructure.

At 450, the method translates across domains. Translation across domains may involve one or more of the underlying infrastructure components, one or more of the data store(s) and one or more users. It is to be appreciated that underlying infrastructure components may belong to one or more plurality of domains, either of disparate multiple domains or a plurality of same or similar domains, or both. It is also to be appreciated that translating across domains may reflect the action of a management component, such as management component 130 as discussed in relation to FIGS. 1 and 3.

At 460, provisioning across domains is undertaken. Provision across domains may involve one or more of the underlying infrastructure components, one or more of the data store(s) and one or more users. It is to be appreciated that underlying infrastructure components may belong to one or more plurality of domains, either of disparate multiple domains or a plurality of same or similar domains, or both. It is also to be appreciated that provisioning across domains may reflect the action of a management component, such as management component 130 as discussed in relation to FIGS. 1 and 3.

Figure 5:
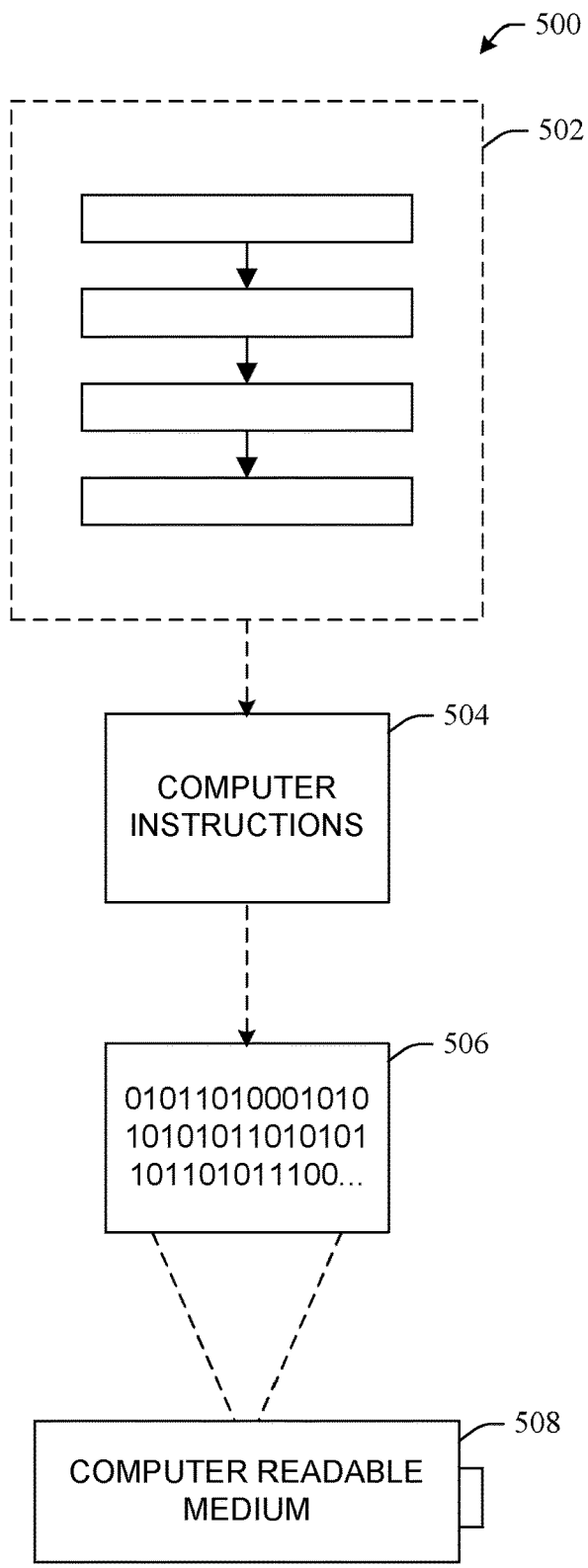
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
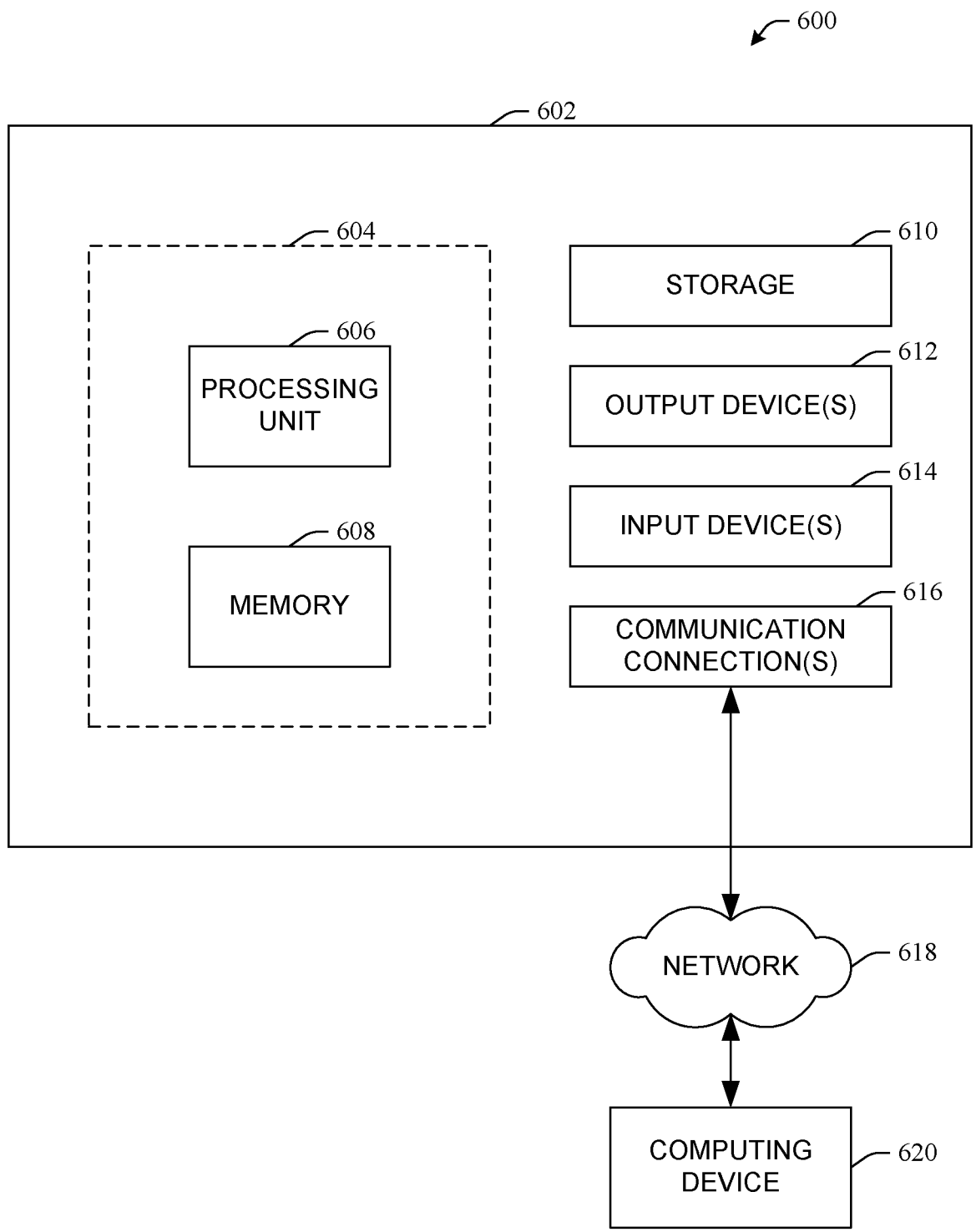
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, APIs, data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a user connection component that provides a controlled access to one or more users;
   a sub-system interface component that provides access to a plurality of domains of an overall electronic infrastructure; and
   a management component that associates the controlled access of the one or more users to access of the plurality of domains, wherein the association automates a plurality of domain access without user interaction, and that management component translates and provisions a plurality of tasks agnostically across the access of the plurality of domains, based at least in part on user controlled access, wherein the plurality of tasks includes Application Program Interface (API) automation services.

2. The system of claim 1, the sub-system interface component comprising:
   an authentication/authorization component that provides infrastructure-wide identity and access controls;
   a plurality of data store components that store global and domain specific data;
   a plurality of underlying infrastructure components that provide domain specific functionalities; and
   wherein the plurality of data store components associate the domain specific functionalities with infrastructure-wide identity and access controls.

3. The system of claim 2, wherein the infrastructure-wide identity and access controls are determined at least in part on the stored global and domain specific data.

4. The system of claim 2, wherein the plurality of underlying infrastructure components are associated with at least one of:
   a subset of domains that are of a different infrastructure from each other, or
      a subset of a plurality of domains of a same infrastructure, wherein the subset of plurality of domains of a same infrastructure has scale impacts to the overall electronic infrastructure.

5. The system of claim 2, the management component comprising:
   a translator component that translates the association of the domain specific functionalities to an agnostic Application Program Interface (API) mapping.

6. The system of claim 5, wherein the mapping is stored in a subset of the plurality of data store components at a sub-system interface component level.

7. The system of claim 5, the management component comprising:
   a provisioning component that permits the one or more users to employ the domain specific functionalities agnostically at a multi-domain management system level through the translator component.

8. The system of claim 7, wherein the provisioning component enables custom domain synchronization between production, development and testing within the overall electronic infrastructure.

9. The system of claim 7, wherein the provisioning component enables newly created profiles to be populated across a plurality of domains from a single creation of the profiles at a management component level.

10. The system of claim 7, wherein the provisioning component operates on at least one of a standardized input or standardized input definition protocol.

11. The system of claim 1, wherein reporting across all domains is enabled by the management component.

12. A method, comprising:
    providing one or more user connections;
    providing authentication/authorization controls for the one or more user connections;
    managing translation and provisioning of services for the authenticated/authorized one or more user connections that span across a plurality of domains of an overall electronic infrastructure, wherein the managing of provisioning of services comprises:
    permitting one or more users to employ domain specific functionalities agnostically at a multi-domain management system level through an association of the domain specific functionalities to an agnostic Application Program Interface (API) mapping.

13. The method of claim 12, the plurality of domains of an overall electronic infrastructure comprising at least one of:
    a subset of domains that are of a different infrastructure from each other, or
       a subset of a plurality of domains of a same infrastructure, wherein the subset of plurality of domains of a same infrastructure has scale impacts to the overall electronic infrastructure.

14. The method of claim 12,
    wherein the providing authentication/authorization controls provide infrastructure-wide identity and access controls;
    and the method further comprising:
    providing the domain specific functionalities, by a plurality of underlying infrastructure components; and
    associating the domain specific functionalities with the infrastructure-wide identity and access controls.

15. The method of claim 14, further comprising:
    storing global and domain specific data, in a plurality of data store components; wherein the infrastructure-wide identity and access controls are determined at least in part on the stored global and domain specific data.

16. The method of claim 14, wherein the managing of provisioning of services further comprises at least one of:
    enabling custom domain synchronization between production, development and testing within the overall electronic infrastructure; and
    enabling newly created profiles to be populated across a plurality of domains from a single creation of the profiles at a management component level.

17. A non-transitory computer readable medium having instructions to control one or more processors configured to:
    receive one or more user connections;
    apply authentication/authorization controls for the one or more received user connections;
    manage translation and provisioning of services for the authenticated/authorized one or more received user connections that span across a plurality of domains of an overall electronic infrastructure and permitting one or more users to employ domain specific functionalities agnostically at a multi-domain management system level through an association of the domain specific functionalities to an agnostic Application Program Interface (API) mapping.

18. The non-transitory computer readable medium of claim 17, wherein the plurality of domains of an overall electronic infrastructure comprise at least one of:
    a subset of domains that are of a different infrastructure from each other or a subset of a plurality of domains of a same infrastructure, wherein the subset of plurality of domains of a same infrastructure has scale impacts to the overall electronic infrastructure; or
    a subset of domains that are of a different infrastructure from each other and a subset of a plurality of domains of a same infrastructure, wherein the subset of plurality of domains of a same infrastructure has scale impacts to the overall electronic infrastructure;

the apply authentication/authorization controls provide infrastructure-wide identity and access controls; and the manage translation and provisioning of services further comprises at least one of:
    enabling custom domain synchronization between production, development and testing within the overall electronic infrastructure; and enabling newly created profiles to be populated across a plurality of domains from a single creation of the profiles at the management component level.

\* \* \* \* \*